United States Patent [19]
Edler

[11] Patent Number: 5,559,834
[45] Date of Patent: Sep. 24, 1996

[54] METHOD OF REDUCING CROSSTALK IN PROCESSING OF ACOUSTIC OR OPTICAL SIGNALS

[76] Inventor: Bernd Edler, Henelingstrasse 10, D-3000 Hannover 21, Germany

[21] Appl. No.: 211,769

[22] PCT Filed: Oct. 6, 1992

[86] PCT No.: PCT/DE92/00855
  § 371 Date: Apr. 15, 1994
  § 102(e) Date: Apr. 15, 1994

[87] PCT Pub. No.: WO93/08482
  PCT Pub. Date: Apr. 29, 1993

[30] Foreign Application Priority Data

Oct. 17, 1991 [DE] Germany .................. 41 34 420.0

[51] Int. Cl.$^6$ ..................................... H04K 1/10
[52] U.S. Cl. .............. 375/260; 375/285; 375/296; 375/349; 370/6; 370/70; 370/72; 370/123; 348/388
[58] Field of Search .................. 375/260, 285, 375/296, 346, 348, 377, 349, 350; 370/6, 19, 49.5, 123, 69.1, 70–72; 364/724.01, 724.2; 348/384, 388, 397, 398; 381/29, 30, 36, 41; 358/426, 428; 382/56

[56] References Cited

U.S. PATENT DOCUMENTS 5,416,767  5/1995  Koppelaar et al. .................. 370/70
5,420,891  5/1995  Akansu .................. 375/350

FOREIGN PATENT DOCUMENTS 2656044  9/1982  Germany .
2908321  6/1984  Germany .

*Primary Examiner*—Stephen Chin
*Assistant Examiner*—Amanda T. Le
*Attorney, Agent, or Firm*—Evenson, McKeown, Edwards & Lenahan P.L.L.C.

[57] ABSTRACT

A method for reducing frequency crosstalk in the transmission of digitized audio signals. Signals from partial bands in which spectral components of specific frequencies occur as signal components and signals from partial bands in which spectral components occur as crosstalk components in the stop range, undergo a weighted summation. Following transmission, the partial band signals undergo an inverse operation to weighted summation. The method operates independently of the selected encoding process, and is consequently universally usable.

12 Claims, 6 Drawing Sheets

METHOD OF REDUCING CROSSTALK IN PROCESSING OF ACOUSTIC OR OPTICAL SIGNALS

BACKGROUND OF THE INVENTION

The invention relates to a method for reducing frequency crosstalk during the transmission and/or storage of acoustic signals.

The more it proves possible to reduce the data quantity to be transmitted without any noticeable quality loss, the more attractive is the transmission and/or storage of digitized acoustic signals. Numerous methods are known for data compression of acoustic signals by transformation of the digitized data in the frequency range or, a subdivision into different frequency bands.

The subdivision into several partial bands can take place in single-stage manner by a filter bank or in multistage manner by the series-connection of two or more filter banks. (A following filter bank can also be replaced by a transformation.) The thus prepared data are compressed to reduce the data quantity utilizing the signal statistics and the psychoacoustics in such a way that, following transmission and inverse transformation of the data, as far as possible the human ear perceives no difference compared with the input signal. In the proposal for the standardization of data compression methods for data audio signals of the International Organization for Standardization, a hybrid filter bank is used to subdivide the signal spectrum into partial bands. The analysis bank in the coder consists of two stages. Firstly the spectrum of the input signal is subdivided into 32 partial bands by a polyphase filter bank, such as is described, for example, by H. J. Nussbaumer, M. Vetterli, "Computationally Efficient QMF Filter Banks", IEEE Proc. ICASSP 1984, p. 11.31–4. Each of these partial bands is then subdivided once again into 12 bands with a following TDAC filter bank. Such a TDAC filter bank is described by J. P. Princen, A. W. Johnson and A. B. Brodley, "Subband/Transform Coding Using Filter Bank Designs Based on Time Domain Aliasing Cancellation", Proc. ICASSP '87, p. 50.1.1–4.

In the publication by S. A. Towns, T. K. Trong, the VSLI design of a subband coder, International Conference on Acoustic Speech and Signal Processing, vol. 2, 1984, New York, 34B 21–24B 24 a comparison takes place of a filter bank having a tree structure and a filter bank having a parallel structure with respect to the design of subband coders in VSLI technology.

A prerequisite for the use of serial separator stages in data compression methods is a good band separation, so that as far as possible each spectral component of the input signal influences only one partial band signal and therefore quantization errors, which occur in the partial bands, influence only the associated frequency range in the output signal.

Therefore the partial band filters of the overall system must have a very high stop band attenuation. The serial arrangement of filter and/or transformation stages gives rise to an inadequate stop band attenuation, however, because in each case several partial bands occur in the transition ranges of preceding separator stages. In the frequency response of the corresponding partial band filter, this leads to a clear rise of the signal outside the pass band.

Therefore the spectral components of the input signal in the corresponding frequency ranges, after passing through the separator stages, influence the partial band signals in the form of crosstalk components. Following the combination of the partial band signals, quantization errors in one of these partial bands correspondingly influence frequency ranges outside the particular partial bands.

In known methods an attempt is made to minimize deterioration of the output signal due to frequency crosstalk by taking account of this effect during coding. However, this is only possible to a limited extent and makes the coding processes more complex.

SUMMARY OF THE INVENTION

The object of the invention is to provide a method for reducing frequency crosstalk, which is particularly effective and operates independently of a following coding.

This object is achieved according to the invention, by performing a weighted summation of the signals from the partial bands (in which corresponding signal or crosstalk components occur) following subdivision. The resulting weighted partial band signals are subsequently coded and transmitted and/or stored and decoded. In order to eliminate the signal change caused by the weighted summation, the decoded partial band signals undergo a process which is inverse to the weighted summation, prior to combination.

For a given system for subdividing the signals into frequency bands, in which the subdivision takes place in series-connected stages, the position and phase relationship of the signal components of the corresponding crosstalk components can be determined.

In another embodiment of the invention, which offers advantages if use is made of a preceding filter stage, the input signal is subdivided into an even number M of partial bands, whereby the spectral components are reflected in the partial bands. In this case the output signals of every other partial band of this filter stage are corrected before the signal is supplied to the following stage. Such correction may be performed by multiplying the partial band signals with the following form $\{1,-1,1-1 \ldots \}$, which cancels out the reflection of the partial band spectra.

In still another embodiment, the weight factors for the summation are optimized for the frequency response of the series-connected stages. In a following filter stage with a subdivision of a signal into an even number of N partial bands, N/2 values of $c_m$ are determined.

The total frequency response of the transmission using the method according to the invention is significantly improved compared with known methods. Moreover, the method according to the invention gives rise to no additional signal falsifications; that is, if the partial band signals are combined without encoding and decoding, the input/output behavior of the overall system is not affected by the method, because as a result of the inverse operation the original partial band signals are reconstructed in error-free manner.

The method according to the invention can be used in universal manner. As the reduction of the frequency crosstalk is independent of the coding processes used, it is suitable for use in the transmission of both acoustic and optical signals.

On subdividing the signal spectrum into partial bands it is possible to use two or more stages. The individual stages can be constituted by filter bands or transform coding.

Other objects, advantages and novel features of the present invention will become apparent from the following detailed description of the invention when considered in conjunction with the accompanying drawings.

DETAILED DESCRIPTION OF THE DRAWINGS

Without restricting the general nature of the invention, by way of example a description is provided hereinafter of a two-stage method, in which the spectrum of the input signal is broken down with the aid of a polyphase filter bank into an even number M of partial bands and using a following TDAC (Time Domain Aliasing Cancellation) filter bank, each of these partial bands is subdivided into an even number of bands.

Figure 1A:
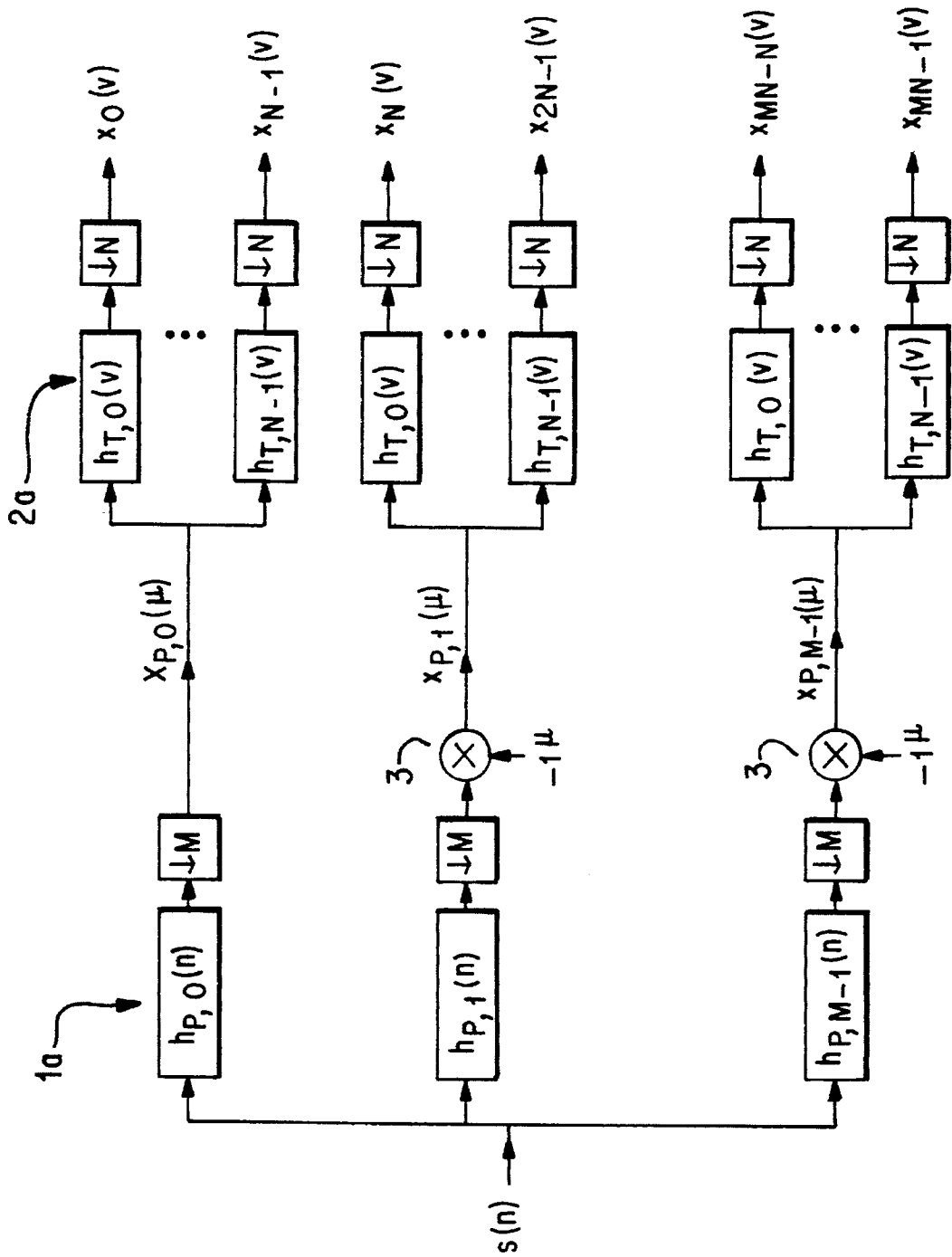
FIG. 1a is a diagrammatic depiction of the subdivision of the spectrum of the input signal into partial bands.

The method for subdividing the signal spectrum is shown in FIG. 1a. A polyphase filter bank 1a breaks down the spectrum of the input signal s(n) with the aid of filters into M partial bands (M:even). The pulse responses of the partial band filter are obtained by multiplication of a sample pulse response $h_p$ of length L with cosine functions, whose frequencies correspond to the center frequencies of the partial bands.

The output signals of the filters are underscanned by the factor M (in the drawing shown as a downward arrow), so that the sum of the scanning rates in all the partial bands remains the same as the scanning rate of the input signal.

After filtering and subscanning, the partial bands with uneven indices are multiplied in multiplier units 3 with the following form {1,–1,1,–1 . . . }, so as to cancel out the reflection caused by the filters and which leads to spectral components with higher and lower frequencies occurring in permutated form in the particular partial bands. For the M partial band signals the following applies:

$$x_{P,k}(\mu) = \sum_{n=0}^{L} s(M\mu - n) \cdot \qquad (1)$$

$$h_P(n) \cdot \cos\left(\frac{\pi}{M}\left(k + \frac{1}{2}\right)\left(n - \frac{M}{2}\right)\right), \begin{array}{c} 0 \leq k \leq M-1 \\ k \text{ even} \end{array}$$

$$x_{P,k}(\mu) = (-1)^\mu \sum_{n=0}^{L} s(M\mu - n) \cdot$$

$$h_P(n) \cdot \cos\left(\frac{-\pi}{M}\left(k + \frac{1}{2}\right)\left(n - \frac{M}{2}\right)\right), \begin{array}{c} 0 \leq k \leq M-1 \\ k \text{ uneven} \end{array}$$

Each of these M partial bands is subdivided with a following TDAC filter bank 2a into N bands (N:even).

The pulse responses of the TDAC filter bank are obtained by multiplication with a sample pulse response $h_T$ (length 2N) with corresponding cosine functions. For the M×N partial band signals the following applies:

$$x_{Nk+m}(v) = \sum_{\mu=0}^{2N-1} x_{P,k}(Nv - \mu) \cdot$$

$$h_T(\mu) \cdot \cos\left(\frac{\pi}{N}\left(m + \frac{1}{2}\right)\left(\mu - \frac{N}{2} + \frac{1}{2}\right)\right), 0 \leq m \leq M-1$$

The successive filter stages consequently subdivide the input signal into M×N partial bands.

Figure 1B:
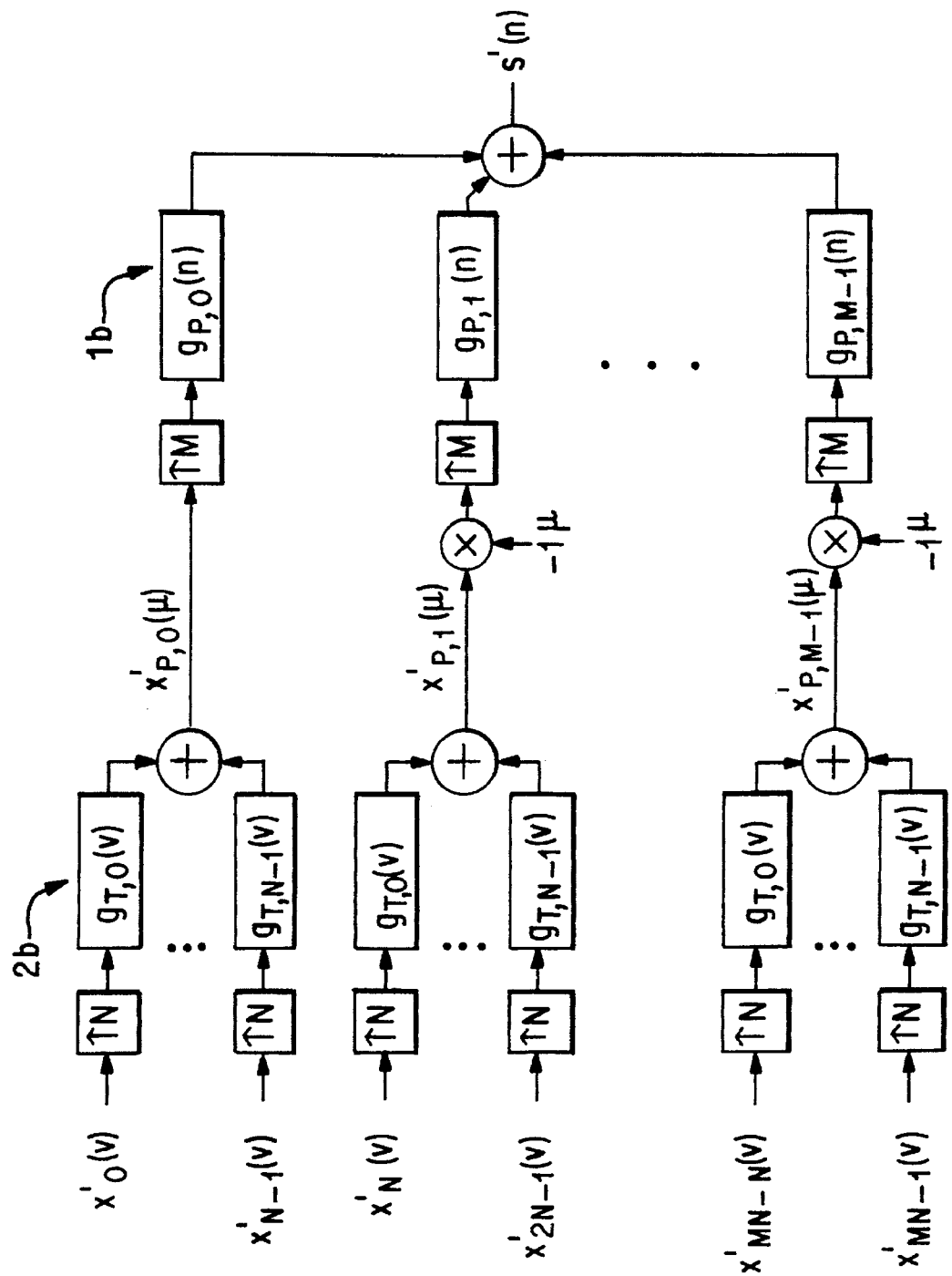
FIG. 1b is a diagrammatic depiction of the combination of the partial band signals to generate an output signal.

FIG. 1b shows the combination of M×N partial band signals to form an output signal in combination stages 1b and 2b.

Figure 2:
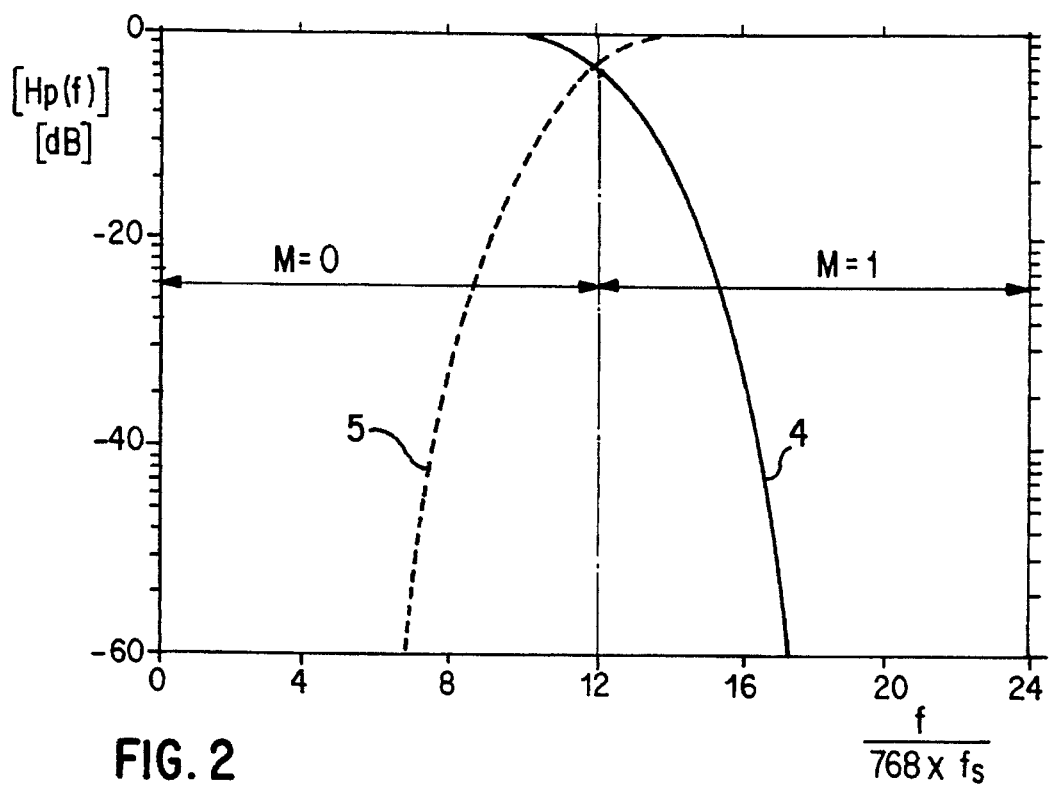
FIG. 2 shows a detail of the frequency responses of the partial band filters 0 and 1 of a polyphase filter bank.

In detail form, FIG. 2 shows the frequency responses of two adjacent partial band filters of a polyphase filter bank with M=32. On the vertical axis is plotted the pulse response in decibels and on the horizontal axis the frequency standardized to the 384 partial bands of the total filter bank (M=32, N=12). The detail extends over the frequency range of the first 24 partial bands of the total filter bank. The frequency response of the partial band filter (M=0) is indicated by the continuous line 4 and that of the partial band filter (M=1) with the broken line 5. It is clearly possible to see the overlap of the frequency responses of the partial band filters.

As in this transition range there are several partial bands of the total filter bank, there is a clear increase of the signal in the frequency response of the corresponding partial band filters outside the pass band, i.e., in the stop band. As a result of a vertical exaggeration of the frequency responses in the stop band, each spectral component whose frequency f is in a transition range of the polyphase filter bank, occurs in two partial bands of the total filter bank, namely as a signal component in the partial band with the pass band at frequency f and as a crosstalk component in the partial band with vertical exaggeration at the frequency f, so that a spectral component of frequency f appears as $$f = k \cdot \frac{f_s}{2M} + m \cdot \frac{f_s}{2MN} + \Delta f,$$

$f_s$ = Scanning frequency $$1 \leq k \leq M-1, -\frac{N}{2} \leq m \leq \frac{N}{2} - 1, 0 \leq \Delta f \leq \frac{f_s}{2MN}$$

in the partial band i=N×k+m as a signal component and in the partial band j=N×k–1–m as a crosstalk component. In addition, the signal and crosstalk components in the corresponding partial bands are at the same frequency:

$$f_i = f_j = \begin{cases} \Delta f & m \text{ even} \\ \frac{f_s}{2MN} - \Delta f & m \text{ uneven} \end{cases}$$

Figure 3:
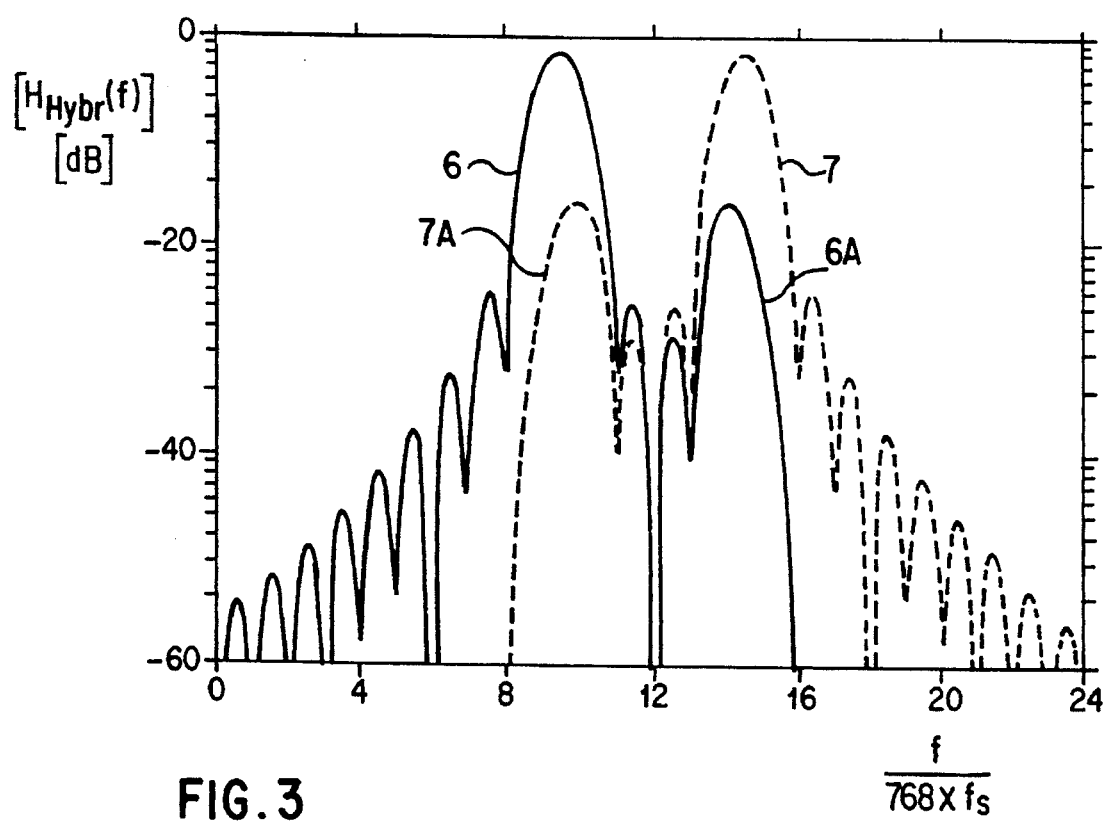
FIG. 3 shows a detail of the frequency responses of corresponding partial band filters without using the method according to the invention.

Such an increase in the frequency response in the partial bands of the total filter bank is shown in FIG. 3. The latter shows details from the frequency responses 6, 7 of partial band filter 9 (continuous line) and partial band filter 14 (broken line), respectively, without using the method according to the invention for reducing the frequency crosstalk. The input signal, which leads to a signal component in the total partial band 9, leads to a crosstalk component 6A in the total partial band 14. Conversely the input signal, which leads to a signal component in the total partial band 14, also leads to a crosstalk component 7A in the partial band 9.

For the selected example of a polyphase filter bank 1a with following TDAC filter bank 2a an analysis of the phase relationships gives a phase difference between the signal and crosstalk components of 180° for $-N/2 \leq m \leq -1$ and 0° for $0 \leq m \leq N/2-1$. if N is an integral multiple of 4. If N is a non-integral multiple of 2, then the phase difference is 0° for $-N/2 \leq m \leq -1$ and 180° for $0 \leq m \leq n/2-1$.

These phase differences make it possible to reduce the crosstalk components by weighted summation or subtraction of the partial band signals $x_i$ and $x_j$.

Figure 4A:
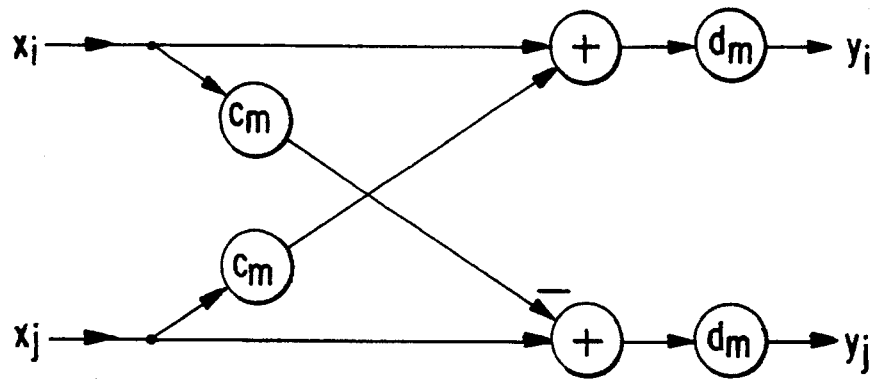
FIG. 4a is a diagrammatic representation of the weighted summation.
Figure 4B:
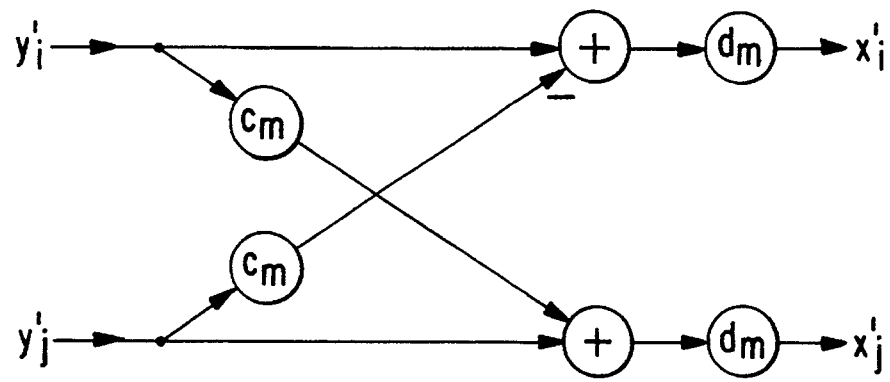
FIG. 4b is a diagrammatic representation of the inverse operation.

FIG. 4a diagrammatically shows the operation of weighted summation with the weight factors $c_m$ and the factors $d_m$ derived therefrom; while FIG. 4b diagrammatically shows the inverse operation with respect to the weighted summation. Due to the uniform structure of the polyphase filter the number of weight factors to be determined is n/2. The weight factors are optimized in such a way that by the choice of one optimum weight factor for each partial band, the crosstalk components are reduced to the maximum extent.

Figure 5A:
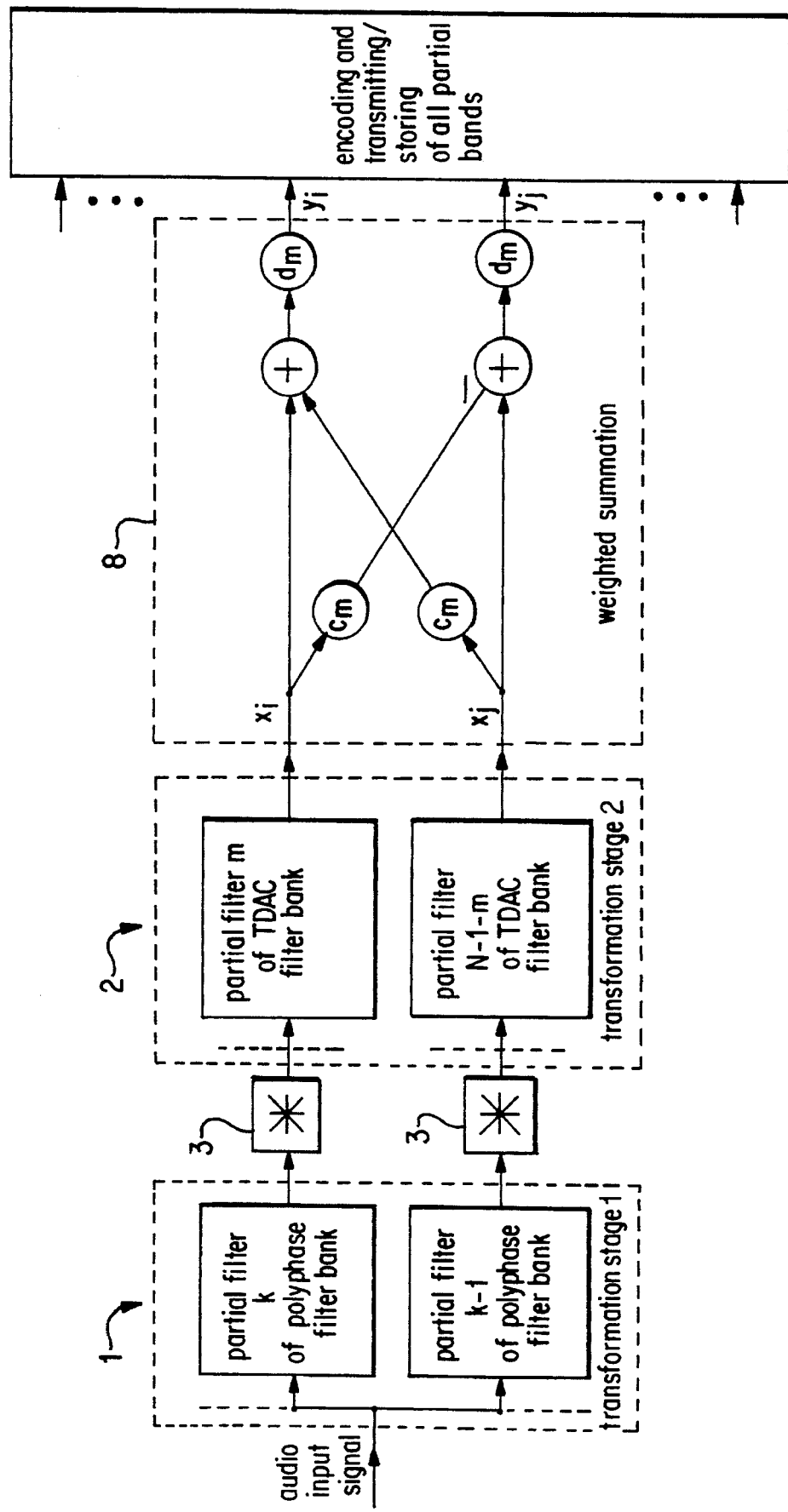
FIG. 5a shows the weighted summation function of FIG. 4a with the filter bank arrangement of FIG. 1.
Figure 5B:
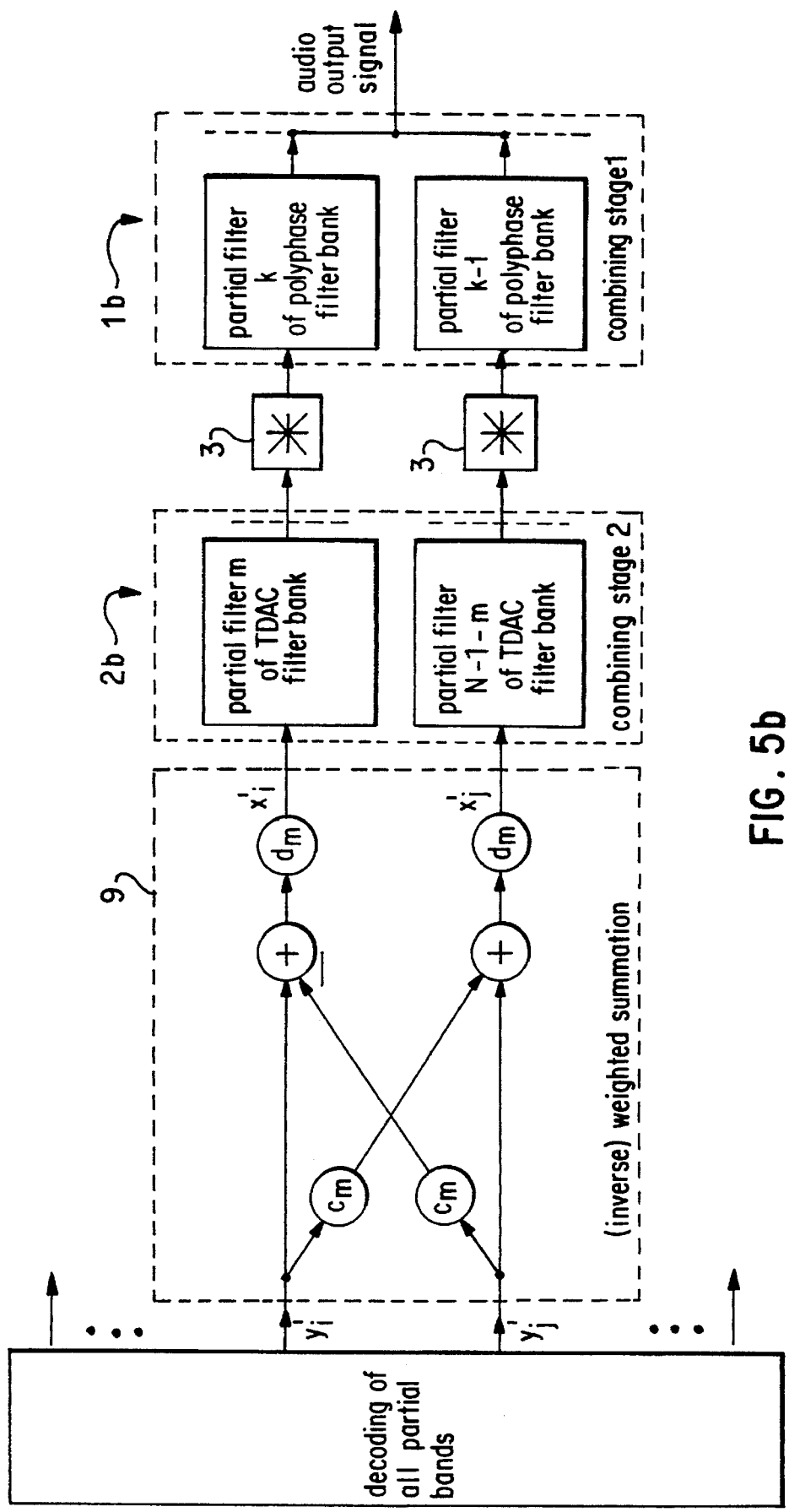
FIG. 5b shows the inverse weighted summation function of FIG. 4b with the combining stages of FIG. 1b.

FIG. 5a shows the weighted summation function of FIG. 4a with the filter bank arrangement of FIG. 1a. As is apparent, the exemplary inputs $X_i$ and $X_j$ to the weighted summation network 8 in FIG. 5a are the respective outputs X of the filter bank stages 1a and 2a of the filter bank of FIG. 1a. Similarly, FIG. 5b shows the inverse weighted summation function 9 of FIG. 4b which outputs representative signals $x'_i$ and $x'_j$ as inputs to the combining filter stages 1b and 2b of FIG. 1b.

Figure 6:
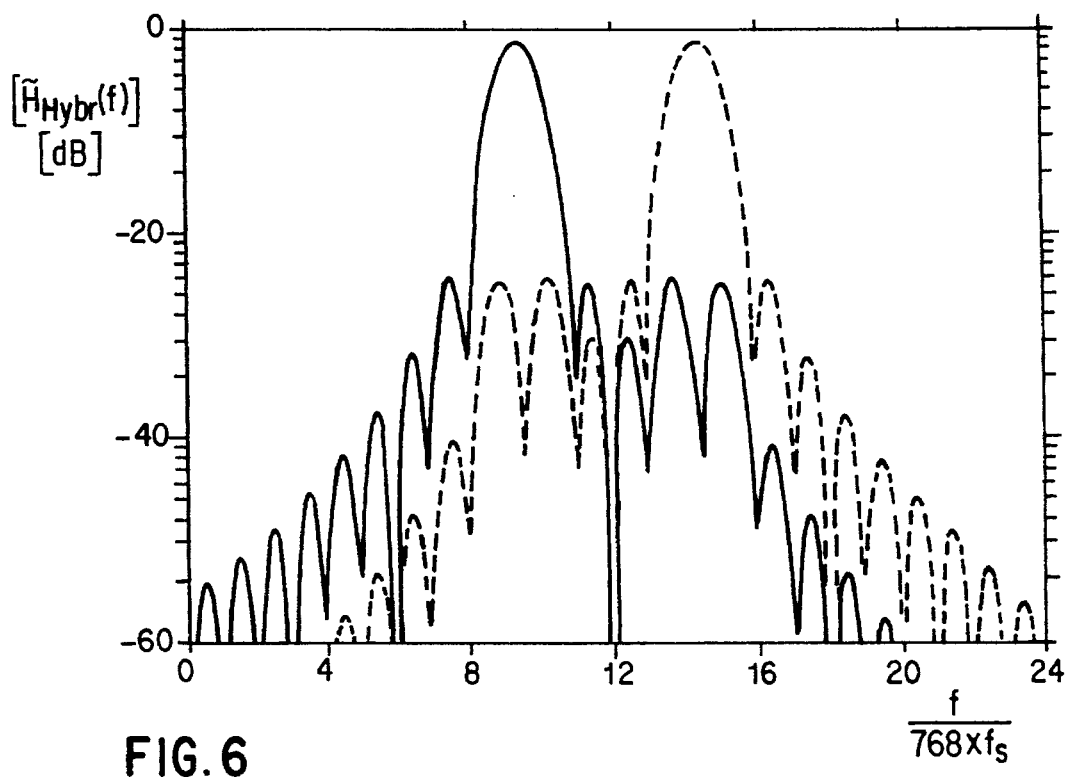
FIG. 6 is a detail of the frequency responses of corresponding partial band filters when applying the method according to the invention.

FIG. 6 shows a detail from the frequency responses of the partial band filters 9 and 14 with the use of the weighted summation or subtraction process according to the invention, and there is a clear improvement compared with FIG. 3 with regards to the rejection characteristic. For this example the optimized weight factors $c_m$ are given below:

| m | cm |
| --- | --- |
| −6 | 0.0000 |
| −5 | 0.0145 |
| −4 | 0.0600 |
| −3 | 0.1700 |
| −2 | 0.3900 |
| −1 | 0.4500 |

The optimized weight factors for the combination of the same polyphase filter bank with a TDAC filter bank, which subdivides the 32 partial bands into in each case a further 18 bands, are:

| m | $c_m$ |
| --- | --- |
| −9 | 0.0000 |
| −8 | −0.0037 |
| −7 | −0.0142 |
| −6 | −0.0410 |
| −5 | −0.0950 |
| −4 | −0.1850 |
| −3 | −0.3300 |
| −2 | −0.5350 |
| −1 | −0.6000 |

The output signals of the filter bank modified with the aid of the method according to the invention correspond to the partial band signals of a total filter bank with improved frequency responses, because the stop band attenuation of the resulting partial band filters are optimized by a suitable choice of the weight factors.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Method for reducing frequency crosstalk in processing of digitized input signals, in which input signals are subdivided into partial frequency bands by means of series connected transformation stages, for subsequent encoding, transmission or storage, followed by decoding, the signals from the partial bands being again combined to form a signal, said method comprising the steps of:

prior to said encoding, for each partial band performing a weighted summation of a partial band signal thereof, which signal contains spectral components of specific frequencies as signal components, and other partial band signals from partial bands in which said spectral components of said specific frequencies occur as crosstalk components in a stop range;

processing the partial band signals by means of an inverse operation to the weighted summation, following decoding.

2. Method according to claim 1, wherein a first transformation stage of said series connected transformation stages subdivides the input signal into an even number M of partial bands 0 to M−1; and means are provided for causing an output signal of uneven numbered partial bands of said stage to undergo a correction operation before entering a second transformation stage.

3. Method according to claim 2, wherein said correction operation comprises multiplying every second time consecutive value of output signals of said uneven numbered partial bands by −1, while the output signals of the even numbered partial bands remain unchanged.

4. Method according to claim 3, wherein weighted signals $y_i$ in the partial band i are obtained in accordance with the following:

$$y_i = d_m \cdot (x_i + c_m \cdot x_j) \quad \text{with} \quad d_m = \frac{1}{\sqrt{1 + c_m^2}}, \quad \begin{array}{l} i = N \cdot k + m \\ j = N \cdot k - 1 - m \end{array}$$
$$y_j = d_m \cdot (x_j - c_m \cdot x_i) \qquad -\frac{N}{2} \leq m \leq -1$$

in which $x_i$ is a partial band signal of partial band i, and $c_m$ and $d_m$ represent weight factors, $d_m$ being determined from the weight factors $c_m$ by the above equation.

5. Method according to claim 2, wherein weighted signals $y_i$ in the partial band i are obtained in accordance with the following:

$$y_i = d_m \cdot (x_i + c_m \cdot x_j) \quad \text{with} \quad d_m = \frac{1}{\sqrt{1 + c_m^2}}, \quad \begin{array}{l} i = N \cdot k + m \\ j = N \cdot k - 1 - m \end{array}$$
$$y_j = d_m \cdot (x_j - c_m \cdot x_i) \qquad -\frac{N}{2} \leq m \leq -1$$

in which $x_i$ is a partial band signal of partial band i, and $c_m$ and $d_m$ represent weight factors, $d_m$ being determined from the weight factors $c_m$ by the above equation.

6. Method according to claim 1, wherein weighted signals $y_i$ i in the partial band i are obtained in accordance with the following:

$$y_i = d_m \cdot (x_i + c_m \cdot x_j) \quad \text{with} \quad d_m = \frac{1}{\sqrt{1 + c_m^2}}, \quad \begin{array}{l} i = N \cdot k + m \\ j = N \cdot k - 1 - m \end{array}$$
$$y_j = d_m \cdot (x_j - c_m \cdot x_i) \qquad -\frac{N}{2} \leq m \leq -1$$

in which $x_i$ is a partial band signal of partial band i, $c_m$ and $d_m$ represent weight factors, $d_m$ being determined from the weight factors $c_m$ by the above equation, N is the number of partial bands in said second transformation stage, k is a partial band index for partial bands of the first transformation stage and m is a partial band index for partial bands of the second transformation stage.

7. Method according to claim 6, wherein said inverse operation is performed according to the following equation:

$$x_i' = d_m \cdot (y_i' - c_m \cdot y_j')$$

$$x_j' = d_m \cdot (y_j' - c_m \cdot y_i')$$

in which $x_i'$ is the partial band signal of partial band i after performing inverse operation $y_i'$, the weighted partial band signal of partial band i, following encoding and decoding.

8. Method according to claim 6, wherein the weight factors $c_m$ for summation are optimized with respect to the frequency response of the series-connected stages.

9. Method according to claim 8, wherein the number of weight factors $c_m$ to be used for summation is half as large as a number of partial bands produced by a following stage.

10. Method according to claim 6, wherein the number of weight factors $c_m$ to be used for summation is half as large as a number of partial bands produced by a following stage.

11. Method according to claim 1, wherein said inverse operation is performed according to the following equation:

$$x_i' = d_m \cdot (y_i' - c_m \cdot y_j')$$

$$x_j' = d_m \cdot (y_j' - c_m \cdot y_i')$$

in which $x_i'$ is the partial band signal of partial band i after performing the inverse operation, and $y_i'$ is the weighted partial band signal of partial band i, following encoding and decoding.

12. Method according to claim 11, wherein the number of weight factors $c_m$ to be used for summation is half as large as a number of partial bands produced by a following stage.

* * * * *